Figure 1:
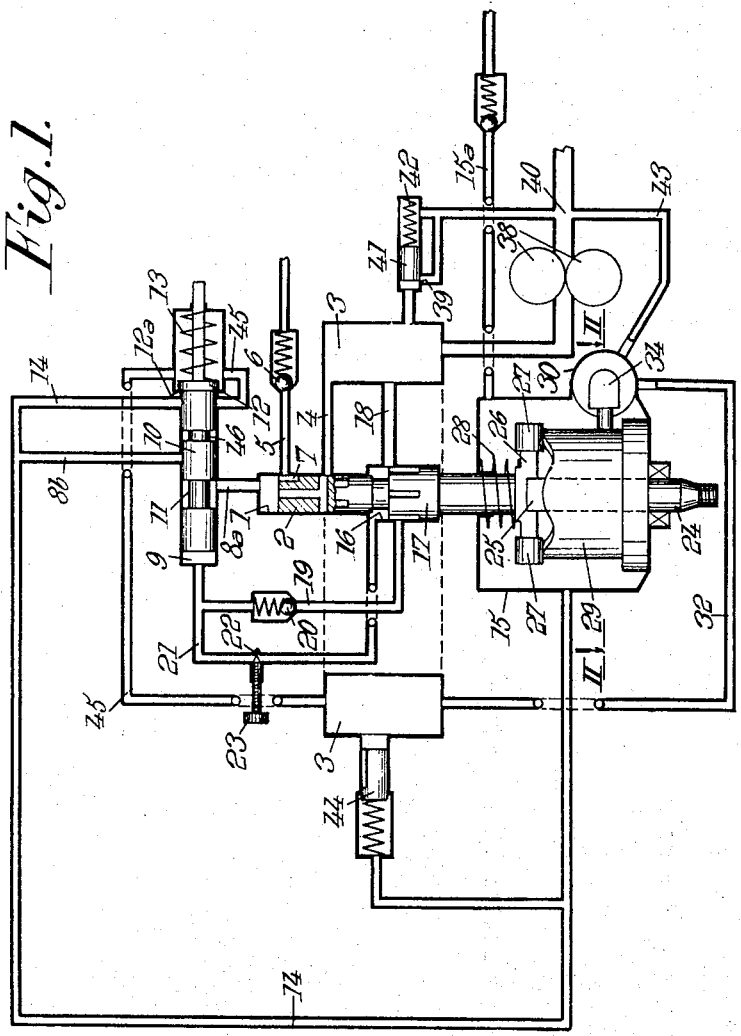

Dec. 19, 1967  G. KULKE  3,358,662
RECIPROCATING FUEL INJECTION PUMPS INCLUDING MEANS
FOR VARYING THE ADVANCE OF INJECTION
Filed Feb. 23, 1965  2 Sheets-Sheet 1

INVENTOR
Günther Kulke

BY Bailey, Stephend E.
Huettig
ATTORNEYS

United States Patent Office 3,358,662
Patented Dec. 19, 1967

3,358,662
RECIPROCATING FUEL INJECTION PUMPS INCLUDING MEANS FOR VARYING THE ADVANCE OF INJECTION
Günther Kulke, Ville d'Avray, France, assignor to Robert Bosch G.m.b.H., Stuttgart, Germany, a society of Germany
Filed Feb. 23, 1965, Ser. No. 434,339
5 Claims. (Cl. 123—139)

The present invention relates to reciprocating fuel injection pumps inluding means for varying the advance of injection and also including a flow rate regulating member. The invention is more especially but not exclusively concerned with pumps of this kind wherein the flow rate regulating member works on the principle of the "liquid abutment" phenomenon.

The object of the invention is to provide an injection pump of this kind which is better adapted to comply with the requirements of practice.

In such pumps it is known to control the means which vary the advance of injection by means of a hydraulic pressure which increases when the number of revolutions per minute of the internal combustion engine fed with fuel by the injection pump increases so as thus to increase the advance of injection and which decreases in the reverse case.

According to the present invention the hydraulic circuit for controlling said means is provided with a spill conduit which is controlled in accordance with a position of said flow rate regulating member in such manner that the spill from the hydraulic circuit is the greater as the flow rate reduction of the pump produced by the regulating member is greater.

The invention introduces, in the advance hydraulic control, a correcting effect which depends upon the flow rate of the fuel injection pump and, consequently, upon the load of the internal combustion engine, in such manner, that the control pressure which varies the advance is the more reduced by this correcting effect as the flow rate of the injection pump per stroke thereof decreases more and more.

This correcting effect may be used: either to reduce for the same number of revolutions of the engine the advance of injection when the load of the engine decreases, or to give a more or less approximately constant value, whatever be the load, to the rearward movement of the member which determines the advance, and the position of which depends upon said control pressure, this rearward movement being produced by the reaction force which, during every delivery stroke of the piston of the injection pump, is exerted on said member.

As a matter of fact, it is known that this reaction is the greater as the flow rate of the injection pump per stroke thereof, and consequently the load of the engine, are greater. Consequently, if the liquid pressure, which is variable with the number of revolutions per minute of the engine, undergoes a correction, as a function of the load, such that it is lower for low loads than for high loads, it is possible to ensure that the rearward movement, under the effect of this reaction variable with the load, is the same for all loads of the engine, whereby the position of the member which determines the advance only depends upon the speed.

Other features of the present invention will result from the following detailed description of some embodiments thereof.

Figure 2:
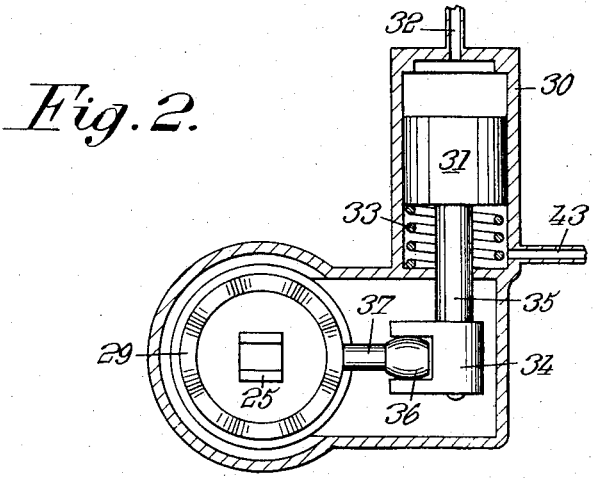
Figure 3:
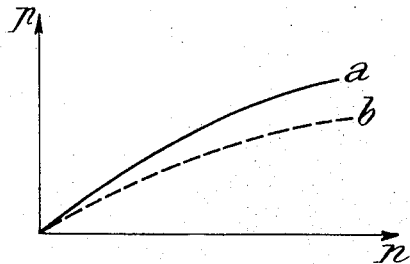
Figure 4:
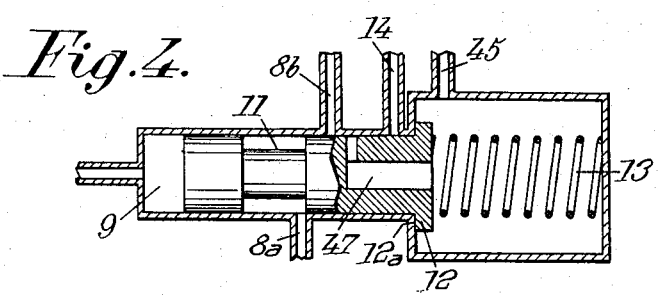

Preferred embodiments of the present invention will be hereinafter described with reference to the appended drawings, given merely by way of example, and in which:
FIG. 1 diagrammatically shows, with parts in elevation and other parts in axial section, a fuel injection pump made according to the present invention;
FIG. 2 is a section on the line II—II of FIG. 1;
FIG. 3 is a diagram illustrating the effect obtained by means of the invention; and
FIG. 4 shows a detailed modification.

The injection pump may either have each of its cylinders cooperating with a given cylinder of the internal combustion engine for feeding it with fuel or it may be a pump provided with distributing means for connecting it successively with the respective cylinders of the internal combustion engine.

In the embodiment of the invention illustrated by FIG. 1 the pump of the second type i.e. it is provided with a distrubuting valve.

This pump comprises a cylinder 1 cooperating with a piston 2 driven with both a reciprocating axial movement and a rotation movement, the last mentioned movement permitting distribution of the fuel supplied by the pump.

Fuel is fed to cylinder 1 from a feed space or tank 3 connected to cylinder 2 through an inlet conduit 4. When piston 2 is moving on a return stroke and during the period for which it stops in its lower dead center position, the compression chamber of cylinder 1 is filled with fuel through channels provided in piston 2.

From cylinder 2 start several delivery conduits 5 leading to the internal combustion engine cylinders, each of said delivery conduits 5 being provided with a delivery valve 6. The drawings shown only one delivery conduit 5.

In order to place the respective delivery conduits, 5, during several consecutive strokes of piston 2, into communication with the compression chamber of cylinder 1, piston 2 is provided with an axial groove 7 which, due to, a rotation of piston 2 above its axis, passes successively opposite the respective delivery conduits 5.

A spill conduit starts from cylinder 1, said spill conduit consisting of two elements 8a–8b between which is interposed a cylinder 9 in which works a reciprocating shuttle 10 in the form of a slide valve provided with an annular groove 11. This groove 11 is constantly in communication with the portion 8a of the spill conduit, but the portion 8b of said spill conduit is closed by the shuttle when the latter is in its position of rest, where a flange 12 thereof is applied against an abutment surface 12a (FIG. 1) by the action of a spring 13. On the contrary spill conduit elements 8a and 8b are connected together through groove 12 as soon as shuttle 10 has moved a given distance against the action of spring 13 (in the drawing toward the right). In view of the fact that spill conduit element 8b is connected through channel 14 with a space at relatively low pressure, for instance casing 15, wherein are located the means for driving piston 2, the placing of elements 8a and 8b into communication with each other immediately stops injection through the injector connected with the delivery conduit 5 which, at this time, is in communication with the compression chamber of the pump through groove 7.

The movement of shuttle 10 toward the right (outward stroke of the shuttle) is ensured by a liquid, preferably consisting of the fuel itself, which is periodically delivered by an axuiliary pump working in synchronism with the injection pump 1, 2. In the example shown by the drawings, this auxiliary pump comprises a cylinder 16 and a piston 17, this piston being integral with piston 2 but of larger diameter than it. Liquid (fuel) is fed to this auxiliary pump from tank 3 through conduit 18 and is delivered through a conduit 19, provided with a check valve 20, to cylinder 9 where it produces the movement of shuttle 10 toward the right. Furthermore, cylinder 9 is connected to the compression chamber of auxiilary pump 16–17 through another conduit 21 in which there is provided a throttled passage 22 the cross section of which is preferably adjustable, for instance through a screw 23.

The return movement of shuttle 10 toward its position of rest during the periods between two consecutive delivery strokes of piston 17 is therefore braked due to the fact that shuttle 10 must force liquid, during said return stroke, through throttled passage 22. Consequently, for speeds of the internal combustion engine above a given value, shuttle 10 can no longer return to its position of rest before the beginning of the next delivery stroke of piston 17. The shuttle is stopped by the liquid just delivered by pump 16–17 into cylinder 9 and it is driven toward the right from a position which is more and more displaced toward the right as the rate of operation of the injection pump exceeds more and more the value for which takes place the above mentioned phenomenon called "liquid abutment." In view of the fact that, at least normally, even above said predetermined rate of operation of the pump, the amount of liquid delivered by piston 17 during every delivery stroke thereof remains unchanged, the production of the liquid abutment has not only for its effect to displace toward the right the position from which the shuttle starts on its outward stroke, but also the position for which it ends its outward stroke.

Obviously, fuel injection from pump 1, 2 toward the injector in communication with the compression chamber of said pump during a given delivery stroke is maximum when shuttle 1 is located, at the beginning of its outward stroke in its position of rest. The more the beginning of said outward stroke is displaced toward the right under the effect of the liquid abutment, the more the amount of liquid delivered by the injection pump toward one of the injectors during a delivery stroke is reduced.

In the embodiment illustrated by FIG. 1, use is made of the displacement toward the right of the position occupied by the shuttle at the end of its outward stroke, which displacement corresponds to a reduction of the amount of fuel delivered on every stroke and, consequently, to a reduction of the torque of the internal combustion, to produce a reduction of the pressure that controls the device serving to vary the advance of injection, that is to say the beginning of the period of injection produced by the injection pump during each of its delivery strokes.

Before describing the means that produce said effect, a short description will be given of the means capable of varying the advance of injection, that is to say of varying the time at which injection begins in relation to the movement of the piston in the cylinder into which fuel is being injected.

It should first be reminded that the transmission means for driving the injection pump from the internal combustion engine fed with fuel by said pump comprises, to vary the advance, two elements the relative angular position of which is variable. If the transmission comprises a cam, as this is generally the case, it is often the relative angular position of the cam with respect to the element moving along the active surface of the cam that is variable.

In the embodiment illustrated by FIG. 1, it is supposed the shaft 24, which extends into casing 15, is driven by the internal combustion engine and that this shaft produces, in a known manner, the movement of rotation of pistons 2 and 17 about their common axis through an element having the shape of a fork 25 which ensures this rotation while enabling said pistons 2 and 7 to have at the same time an axial reciprocating movement. This reciprocating movement is produced by an arm 26 connected to the pistons and the ends of which carry rollers applied by a spring 28 against the active surface of a cam 29 rotatable about the common axis of shaft 24 and pistons 17 and 2. As a rule, said cam is stationary but it is adapted to undergo small angular displacements about its axis in order to vary the advance of injection. These angular displacements are obtained by means of a hydraulic device including a cylinder 30 and a piston 31 movable in said cylinder in one direction under the action of liquid (fuel) under pressure fed through a conduit 32 and in the opposed direction under the action of a spring 33. The movements of piston 31 are transmitted to cam 29 through a fork 34 fixed to the rod 35 of piston 31 and cooperating with the rounded head 36 of a rod 37 fixed to cam 29. The movement of piston 31 under the influence of an increase of the pressure of the fuel fed through conduit 32 produced a movement of cam 29 increasing the advance, which means that the beginning of injection takes place earlier with respect to the movement of the internal combustion engine piston, whereas the movement of piston 31 in the opposed direction reduces the advance, the beginning of the injection being delayed with respect to the movement of the internal combustion engine piston.

The liquid under pressure fed to cylinder 30 through conduit 32 is that existing in tank 3 from which conduit 32 branches off. The pressure of this liquid is variable with the number of revolutions per minute of the internal combustion engine due to the fact that space 3 is fed with liquid through a pump the delivery of which is proportional to its speed, for instance a gear pump 38, or a blade pump, driven by the engine fed from a feed tank through a feed conduit 40, and that a leak 39 is provided in the delivery circuit of this pump, through which leak a portion of the fuel delivered by the pump can return to feed conduit 40. In order to moderate the variation of the pressure in accordance with the speed at which pump 38 is driven, the cross section of leak 39 is increased by a piston 41 when the delivery pressure increases and reduced in the contrary case, this piston 41 being subjected to the delivery pressure of pump 38 acting against a spring 42.

The movements of piston 31, and therefore the angular displacements of cam 29, take place in accordance with the number of revolutions per minute of the internal combustion engine.

It should further be noted that the portion of cylinder 30 that contains spring 33 is connected to feed conduit 40 through a channel 43 and that a venting valve 44 is mounted on space 3. Channel 15a ensures the return of the liquid to a feed tank.

According to the invention, in order to adjust the pressure acting upon piston 31 i.e., in order to adjust the phase relation between the reciprocations of pump 1, 2 of those of the pistons of the internal combustion engine, in response to variations of the delivery of injection pump 1, 2 per stroke thereof and therefore of the load of the internal combustion engine, there is provided, in the feed circuit of cylinder 30, a spill conduit 45 which is itself controlled in accordance with the position of shuttle 10 in such manner that the value of the spill from the feed circuit is the greater as the reduction of the injection pump flow rate produced by the shuttle is greater. This spill conduit 45 may branch off either directly from cylinder 30 or conduit 32 or, as shown by FIG. 1, from space 3. It is controlled by shuttle 10 and for this purpose opens into the cylinder 9 thereof at a point such that it is closed by the shuttle not only for the position of rest thereof but during the whole outward stroke of the shuttle, provided that this outward stroke starts from said position of rest. On the contrary, when the starting point of the shuttle outward stroke is displaced toward the right due to the liquid abutment effect, a passage provided in the shuttle, for instance in the form of a groove 46, begins to place spill conduit 45 into communication with channel 14 which thus connects the spill conduit with the space 15 in which there is a practically constant low pressure close to the atmospheric pressure.

According to a modification illustrated by FIG. 4, groove 46 may be replaced by a channel 47 provided inside the shuttle and starting from the end face thereof to open into its side surface. By giving particular shapes to the cooperating openings through which said channel 47 and channel 14 open into cylinder 9, it is possible to ensure any desired law of variation of the cross section of the communication between spill conduit 45 and channel 14 in accordance with the delivery of the pump per stroke thereof.

As the liquid abutment produces a greater and greater displacement toward the right of the starting point of the shuttle outward stroke, the spill produced by the communication between conduit 45 and channel 14 becomes more important. At the same time, this displacement of the starting point of the shuttle outward stroke produces a reduction of the amount of fuel delivered on every stroke of the injection pump toward the injector or injectors which, every time, are placed in communication with the compression chamber of the pump through groove 7.

The diagram of FIG. 3 shows the correcting effect obtained by means of the invention. In this diagram, the abscissas represent the number of revolutions $n$ per minute of the internal combustion engine, whereas the ordinates represent the pressure $p$ in space 3 that is to say the pressure acting upon the piston 31 of the device which varies the advance of injection. As long as the internal combustion engine works under full load, that is to say that the shuttle starts on each of its outward strokes from the position of rest, the variation of pressure $p$ as a function of the speed $n$ is indicated by the curve in solid lines $a$. On the contrary if, for a partial load, the shuttle starts on its outward stroke from a position located on the right (FIG. 1) of its position of rest, so that some spill takes place in space 3 due to the communication supplied by the shuttle between conduits 45 and 14, the variation of the pressure in space 3 as a function of the speed $n$ is indicated by the curve in dotted lines $b$.

As above stated, correction of the pressure $p$ obtained according to the present invention in feed space 3 may be used in various manners. Of course, it is necessary to choose according to the desired purpose the factors which determine the law according to which the cross section of the communication between conduits 45 and 14 varies in accordance with the load, with the compressibility of spring 32, and so on. Thus, it is possible to make independent of the load of the internal combustion engine the rearward movement to which is subjected cam 29 and, together therewith, piston 31 under the effect of the force of reaction exerted by the pump piston 2 upon said cam 29, which force is variable with the load. Up to the present time, this reaction, which increases when the load increases, has resulted in a reduction of the advance for high loads, in view of the fact that the pressure of the liquid acting upon piston 31 and opposing this rearward displacement was independent of the load. Owing to the present invention it is possible to obtain that the resistance opposed by the liquid to the reaction force is adapted thereto, that is to say that it is greater for high loads and weaker for low loads, whereby the rearward movement becomes independent of the load of the internal combustion engine. By taking into account this rearward movement it is possible to obtain a variation of the advance which depends only upon the speed $n$.

Furthermore, it is possible to obtain, beyond what has been above stated, that for the same speed of the internal combustion, the advance for low loads becomes smaller than the advance for high loads. The obtainment of this result is also useful in the cases where one eliminates the effect that the reaction force exerted by the pump piston has upon the advance by blocking piston 31 in the position it occupies, which is a function of the speed of the engine, during the whole delivery stroke of the pump piston (see on this point the French Patent No. PV 953,761 filed Nov. 14, 1963 by the applicant).

Of course the flow rate regulating element, instead of being constituted not by a shuttle working on the "liquid abutment" principle, is different, consisting for instance of a valve controlling the admission of fuel to the pump, or of a rack rotating about its axis the pump piston provided with an oblique control surface.

In a general manner, while the above description discloses what are deemed to be practical and efficient embodiments of the present invention, said invention is not limited thereto, as there might be changes made in the arrangement, disposition and form of the parts without departing from the principle of the invention as comprehended within the scope of the appended claims.

What is claimed is:

1. For use in connection with an internal combustion engine, an improved fuel injection system comprising, in combination,
    a fuel feed pump for injecting fuel into said internal combustion engine, mechanically driven by said internal combustion engine in synchronism therewith,
    means for controlling the output of said pump per stroke thereof,
    means responsive to variations of the pressure of a liquid for controlling the phase relation between the operation of said pump and that of said internal combustion engine so as to increase the advance of injection of fuel from said pump to said internal combustion engine as the number of revolutions per minute of said engine increases, and inversely,
    a hydraulic circuit for feeding said liquid to said last mentioned means, and
    pump means operative by said internal combustion engine for feeding to said hydraulic circuit liquid at a pressure in relation to the number of revolutions per minute of said engine,
    wherein the improvement comprises,
    liquid discharge means branching off from said hydraulic circuit and responsive to said pump output controlling means for producing a discharge of liquid from said hydraulic circuit the greater as said pump output controlling means produce a greater reduction of the output from said feed pump.

2. A fuel injection system according to claim 1 wherein said means for controlling the output of said pump are responsive to the number of revolutions per minute of said internal combustion engine so as to reduce said pump output as said number of revolutions increases,
    means responsive to variations of the pressure of a liquid for controlling the phase relation between the operation of said pump and that of said internal combustion engine so as to increase the advance of injection of fuel from said pump to said internal combustion engine as the number of revolutions per minute of said engine increases, and inversely,
    a hydraulic circuit for feeding said liquid to said last mentioned means, and
    pump means operative by said internal combustion engine for feeding to said hydraulic circuit liquid at a pressure in relation to the number of revolutions per minute of said engine,
    wherein the improvement comprises,
    liquid discharge means branching off from said hydraulic circuit and responsive to said pump output controlling means for producing a discharge of liquid from said hydraulic circuit the greater as said pump output controlling means produce a greater reduction of the output from said feed pump.

3. A fuel injection system according to claim 2 wherein said means for controlling the pump output per stroke thereof comprises,
    a fixed cylinder,
    a fuel discharge conduit leading from said cylinder,
    a sliding shuttle in said cylinder adapted to connect said discharge conduit with the delivery of said pump, and
    hydraulic means for operating said shuttle, said hydraulic means including a shuttle operating pump operatively connected with said fuel feed pump to work in synchronism therewith, a liquid feed conduit leading to said last mentioned pump, a unidirectional flow delivery pipe for feeding liquid from said shuttle operating pump to said cylinder to move said shuttle toward the position thereof for which it connects said discharge conduit with said fuel feed pump delivery and a return conduit between said cylinder and said last mentioned pump, said return conduit having a throttled portion, whereby a liquid abutment is produced in said cylinder to prevent return of said shuttle to its position of rest when the speed of said internal combustion engine exceeds a given value.

4. A fuel injection system according to claim 3 wherein said liquid discharge means consist of a spill conduit leading from said cylinder said sliding shuttle being provided to connect said spill conduit with said hydraulic circuit in response to the displacements of said shuttle.

5. A fuel injection system according to claim 4 which comprises,
a fuel tank for feeding fuel to said fuel feed pump,
said hydraulic circuit being in communication with said fuel tank so that the liquid in said hydraulic circuit is fuel from said tank,
said pump means having the delivery thereof connected with said fuel tank.

References Cited

UNITED STATES PATENTS

| | | | |
|---|---|---|---|
| 2,965,037 | 12/1960 | Bessiere | 123—139 |
| 3,168,042 | 2/1965 | Bessiere | 103—2.1 |
| 3,177,860 | 4/1965 | Glikin | 123—139 |

LAURENCE M. GOODRIDGE, *Primary Examiner.*

MARK NEWMAN, *Examiner.*